(12) United States Patent
Kurihara

(10) Patent No.: US 7,438,340 B2
(45) Date of Patent: Oct. 21, 2008

(54) MOTORCYCLE WITH STORAGE COMPARTMENT

(75) Inventor: Kouji Kurihara, Iwata (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 11/690,332

(22) Filed: Mar. 23, 2007

(65) Prior Publication Data
US 2008/0030041 A1 Feb. 7, 2008

(30) Foreign Application Priority Data
Mar. 24, 2006 (JP) ............................. 2006-081938

(51) Int. Cl.
*B62J 17/00* (2006.01)
(52) U.S. Cl. ..................... 296/78.1; 296/37.1
(58) Field of Classification Search ............... 296/78.1, 296/37.1; 224/413, 419, 425; 206/335; 150/167; 180/219
See application file for complete search history.

(56) References Cited

U.S. PATENT DOCUMENTS

| | | | | |
|---|---|---|---|---|
| 4,522,442 A | * | 6/1985 | Takenaka | 296/78.1 |
| 4,619,476 A | * | 10/1986 | Kawasaki | 296/78.1 |
| 4,697,842 A | * | 10/1987 | Kawasaki | 296/78.1 |
| 4,915,188 A | * | 4/1990 | Ota et al. | 180/219 |
| 6,428,075 B2 | * | 8/2002 | Kamemizu et al. | 296/37.1 |
| 6,435,585 B1 | * | 8/2002 | Aoki | 296/37.1 |
| 2007/0236949 A1 | * | 10/2007 | Kurihara | 362/475 |
| 2007/0240924 A1 | * | 10/2007 | Kurihara | 180/219 |
| 2007/0285272 A1 | * | 12/2007 | Umeda et al. | 340/825 |

* cited by examiner

*Primary Examiner*—Kiran B. Patel
(74) *Attorney, Agent, or Firm*—Knobbe, Martens, Olson & Bear LLP

(57) ABSTRACT

A motorcycle having a storage compartment structure having an improved outward appearance by avoiding exposure of one or more fasteners utilized in connection with the storage compartment structure to a driver's side of the motorcycle. A storage compartment comprises a leg shield and plates separate from the leg shield. The plates are detachably mounted to the leg shield by one or more clamping members or fasteners, such as screws, which are inserted into the leg shield in a direction from the front of the motorcycle toward the rear of the motorcycle.

5 Claims, 12 Drawing Sheets

MOTORCYCLE WITH STORAGE COMPARTMENT

RELATED APPLICATIONS

This application is related to, and claims priority from, Japanese Patent Application Ser. No. 2006-081938, filed Mar. 24, 2006, the entirety of which is incorporated herein and made a part of the present specification.

BACKGROUND OF THE INVENTION

1. Field of the Invention

The present invention generally relates to a storage compartment of a motorcycle. More particularly, the present invention relates to a storage compartment provided on a leg shield of a motorcycle, wherein the leg shield covers the front of driver's legs.

2. Description of the Related Art

Motorcycles, and scooter-type motorcycles in particular, often include a storage area or compartment provided on a leg shield, which covers the front of driver's legs. For example, Japanese Application No. 58-6777 proposes, as a storage compartment of this kind, a construction in which an inner housing separate of a leg shield is arranged on a side of the leg shield toward a driver. The inner housing is fixed to the leg shield by a plurality of screws which are inserted from a driver's side, through the inner housing and into the leg shield.

SUMMARY OF THE INVENTION

Such conventional storage compartment arrangements, similar to the example described above, adopt a construction in which the inner housing is fixed to the leg shield by a plurality of fasteners, such as tapping screws. The screws are inserted through the inner housing and into a driver's side of the leg shield. Such an arrangement results in the heads of the tapping screws being exposed towards a driver's side of the leg shield, which leads to a deterioration in the outward appearance of the motorcycle. Furthermore, in such an arrangement, the tapping screws are subject to undesired removal, such as by mischief or the like.

An object of at least one of the preferred embodiments is to provide a storage area, or storage compartment, for a motorcycle that does not lead to a deterioration in outward appearance caused by exposure of a fastener used in connection with the creation of the storage area to a driver's side of the leg shield. A further object of at least one of the preferred embodiments is to reduce the likelihood of the fastener from being undesirably removed as a result of mischief, or the like.

An aspect of the present motorcycle is a storage compartment provided on a leg shield, which is positioned in front of the driver's legs, and wherein the storage compartment is defined by the leg shield and a plate that is separate from the leg shield. The plate is detachably secured to the leg shield by a fastener, which is inserted into the leg shield in a direction from the front of the motorcycle towards a rear of the motorcycle.

In one arrangement, the fastener may be inserted in a direction substantially parallel to a vertical plane including a center line in a longitudinal direction of the motorcycle. However, in another arrangement, the fastener can be inserted at an angle from such a vertical plane. For example, the fastener can be inserted in a direction within the range of about 45 degrees to the vertical plane in both a left and right direction from the vertical plane. Each of these arrangements are examples of fasteners that are inserted in a direction from the front of the motorcycle towards a rear of the motorcycle.

Furthermore, the term "fastener" is a broad term for an object or mechanism for securing one component to another component. The term fastener as used herein includes screws, self-tapping screws and other similar items, for example, bolts. The term fastener can also include a variety of types of clamping members, rivets, snap-fit mechanisms and other non-threaded fastening structures.

With a storage compartment as described above, in which the storage compartment comprises the leg shield and a separate plate and the plate is secured to the leg shield by a clamping fastener inserted in a direction from the front of the motorcycle towards a rear of the motorcycle, the clamping member is hidden by the leg shield to be unseen from a driver's side and it is possible to prevent the deterioration of an outward appearance of the motorcycle that would otherwise be caused by exposure of the fastener to the driver's side. In addition, the likelihood of undesired removal of the fastener, such as a result of mischief, can be reduced or eliminated.

BRIEF DESCRIPTION OF THE DRAWINGS

These and other features, aspects and advantages of the present motorcycle with storage compartment are described below with drawings of preferred embodiments, which are intended to illustrate, but not to limit, the present invention. The drawings contain twelve (12) figures.

DETAILED DESCRIPTION OF THE PREFERRED EMBODIMENTS

Figure 1:
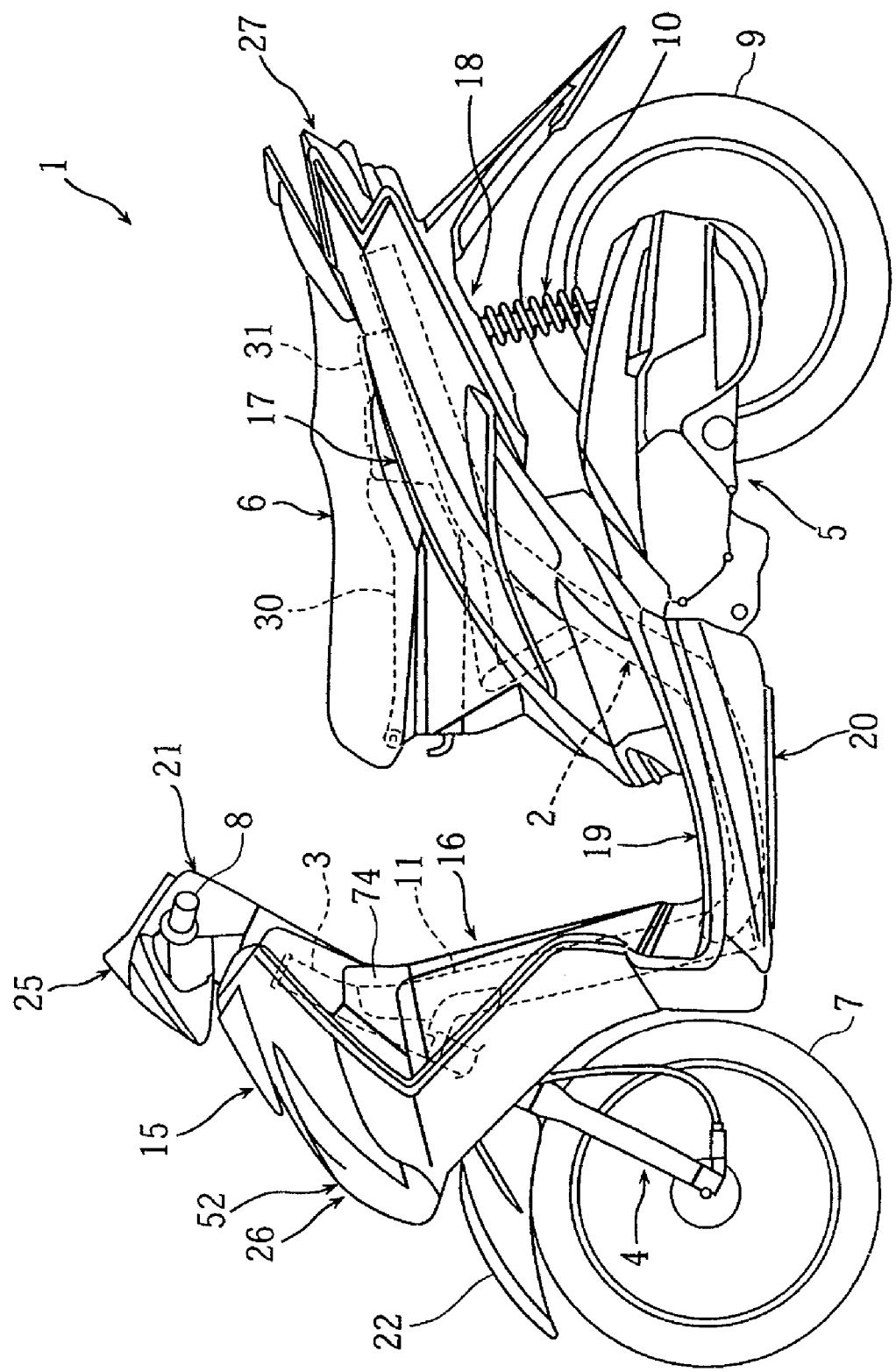
FIG. 1 is a side view of a motorcycle provided with a storage compartment having certain features, aspects and advantages of one or more embodiments of the invention.

FIGS. 1 to 11 are views illustrating a storage device of a motorcycle having certain features, aspects and advantages of an embodiment of the invention. For convenience, as used herein, the terms front, rear, left and right refer to front, rear, left and right directions from the perspective of a rider seated normally on a seat of the motorcycle. Furthermore, certain features may be described with reference to a vertical plane passing lengthwise through a center of the motorcycle. The term lateral refers to a direction perpendicular to the central, vertical plane.

In the drawings, reference numeral 1 generally refers to a scooter-type motorcycle comprising a generally U-shaped, step-through style body frame 2. However, aspects of the described embodiments may be employed on other types of motorcycles, or vehicles, as well. In the illustrated motorcycle 1, a front fork 4 is pivotally supported by a head pipe 3 positioned at a front end of the body frame 2 such that the front fork 4 is steerable to the left and right. A swing-type engine unit 5 is pivotally supported centrally of the body frame 2 to be swingable vertically. A straddle-type (or saddle-type) seat 6 is mounted on the body frame 2 above the engine unit 5. The seat 6 may be a double seat sized to accommodate an operator and a passenger of the motorcycle 1.

A front wheel 7 is journaled to a lower end of the front fork 4. A steering mechanism, such as a handlebar 8, is fixed to an upper end of the front fork 4. A front fender 22 is arranged on the front fork 4 to cover an upper portion of the front wheel 7.

A rear wheel 9 is journaled on a rear end of the engine unit 5 and a rear shock absorber 10 is arranged between the engine unit 5 and the body frame 2 to attenuate movement therebetween.

A storage box 30 and a fuel tank 31, respectively, are arranged longitudinally below the seat 6. A front end of the seat 6 is supported by the storage box 30 to be able to rotate vertically into an open position to permit access to the storage box 30.

A handlebar cover 21 is mounted to the steering handlebar 8 to surround a periphery of the steering handlebar 8. Arranged on the handlebar cover 21 is a meter device 25 including a speedometer, a fuel quantity meter, as well as other desirable instruments or gauges.

A lower portion of a periphery of the seat 6 is covered by left and right side covers 17, 17 (only one shown). A rear fender 18 is arranged beneath the left and right side covers 17, 17 to cover an upper portion of the rear wheel 9. A taillight device 27 is arranged at rear ends of the left and right side covers 17, 17.

The head pipe (or tube) 3 of the body frame 2 and a main pipe (or tube) 11, which extends obliquely rearward and downward from the head pipe 3, are covered by a leg shield 13, which is positioned generally in front of the driver's legs to cover or protect the driver's legs from wind or objects.

A foot board 19, on which the driver and/or passenger can place his or her feet, is arranged between the leg shield 13 and the left and right side covers 17. An underneath side of the foot board 19 is covered by a lower cover 20.

The leg shield 13 comprises a front cover 15 and a rear cover 16. The rear cover 16, in the illustrated arrangement, is made of a resin-containing material and covers the rear (side toward the driver) of the head pipe 3 and the main pipe 11. The front cover 15, which is also made of a resin-containing material, is positioned forwardly of the rear cover 16 to cover the front of the head pipe 3 and the main pipe 11. The front cover 15 and the rear cover 16 are mounted to the body frame 2 and fixed to each other by one or more fasteners, such as by a plurality of screws, for example. In the illustrated arrangement, outer peripheral edges of the front and rear covers 15, 16 are fitted together.

A headlight device 26 is arranged on the front cover 15. The headlight device 26 comprises a lens 52, which is substantially V-shaped as viewed from the front of a vehicle. A headlight bulb 53 is arranged generally in a central portion of the lens 62. Turn signal, or flasher, bulbs 56a, 56a are arranged at left and right upper ends of the V-shaped lens 52, respectively.

Figure 2:
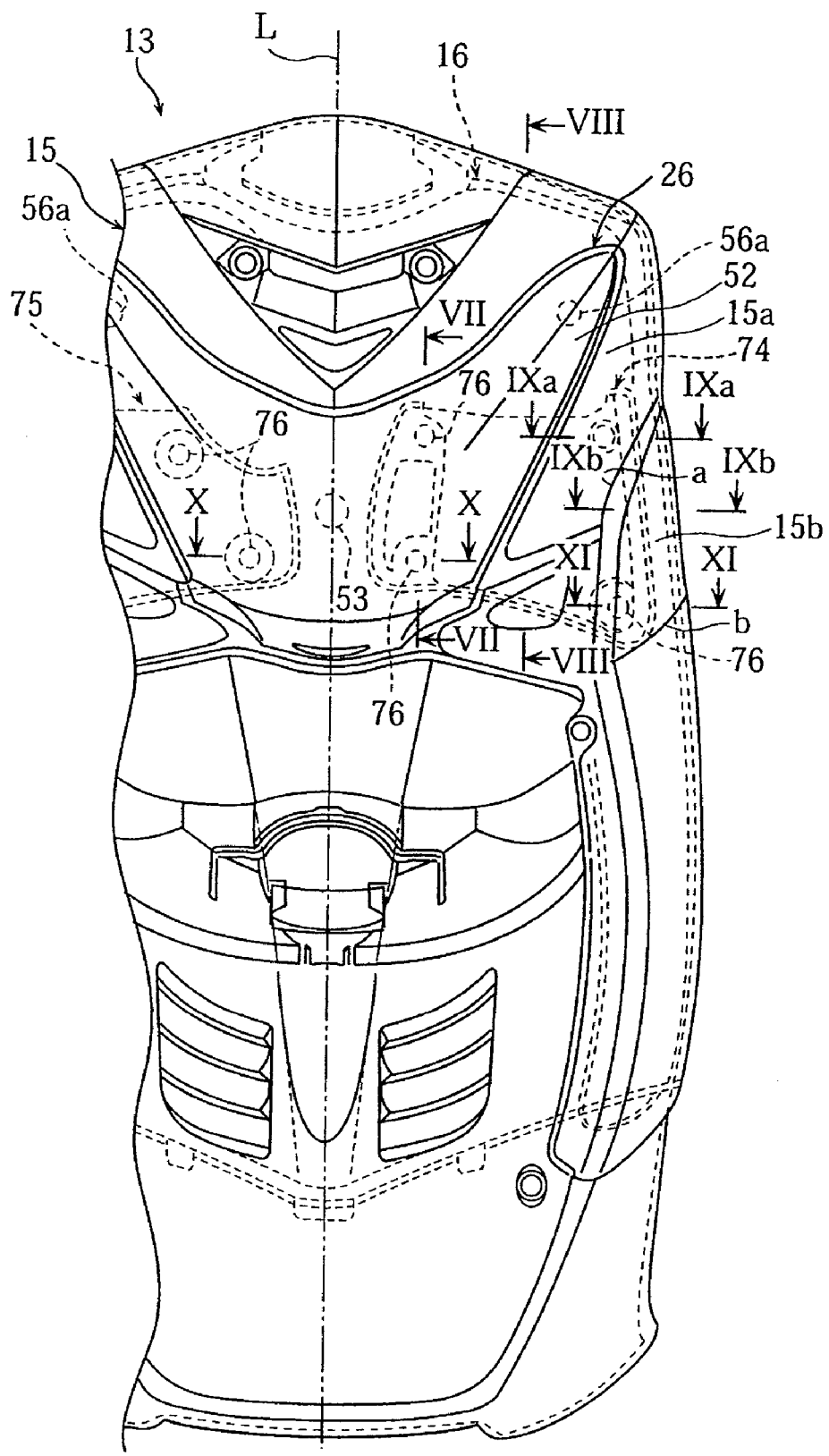
FIG. 2 is a front view of the motorcycle of FIG. 1 showing a leg shield with which the storage compartment is associated.
Figure 3:
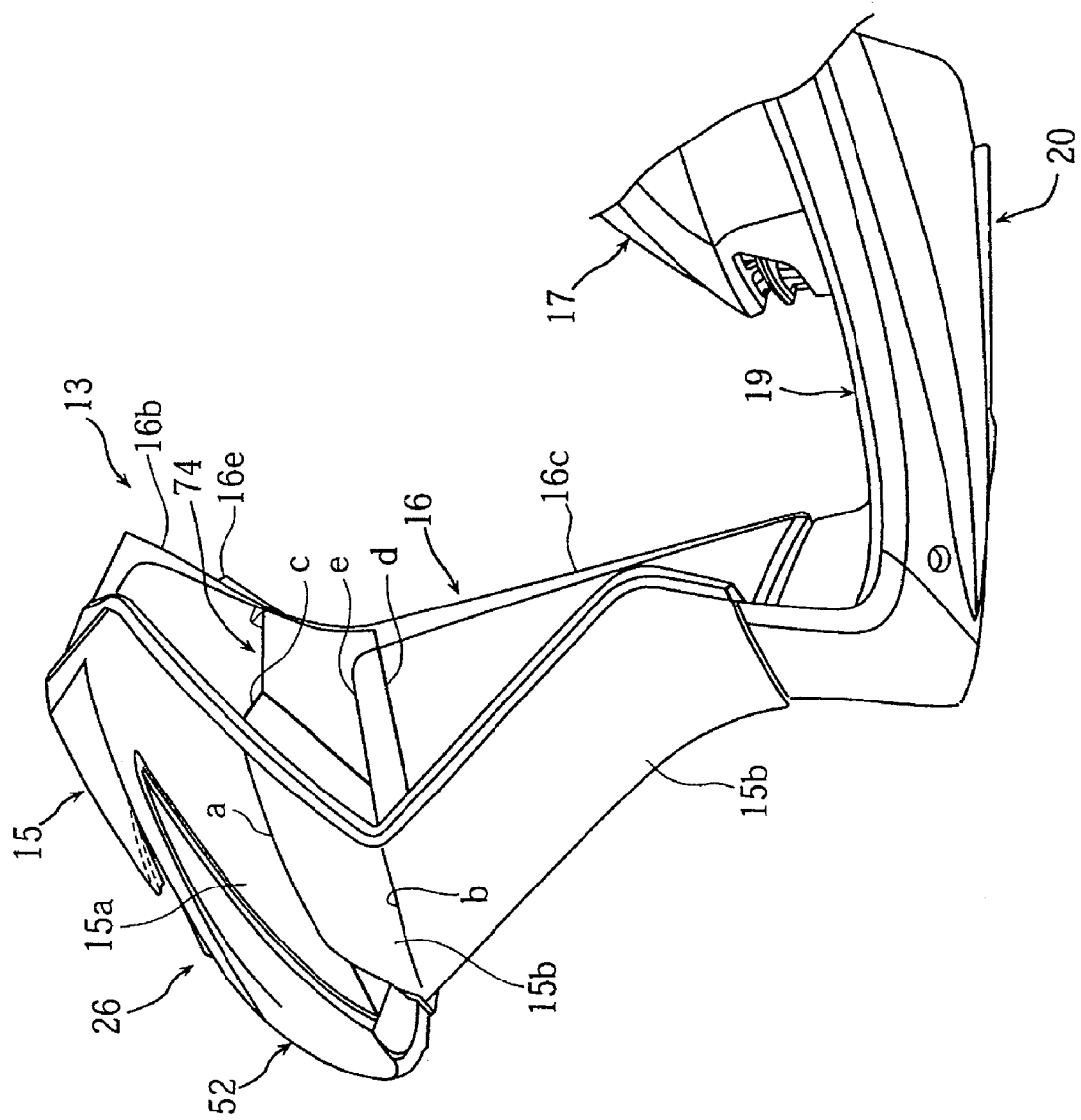
FIG. 3 is a side view of the leg shield of FIG. 2, which illustrates a front cover and a rear cover of the leg shield. A pair of plates are coupled to the leg shield and individually cooperate with the leg shield to form a pair of storage compartments.
Figure 4:
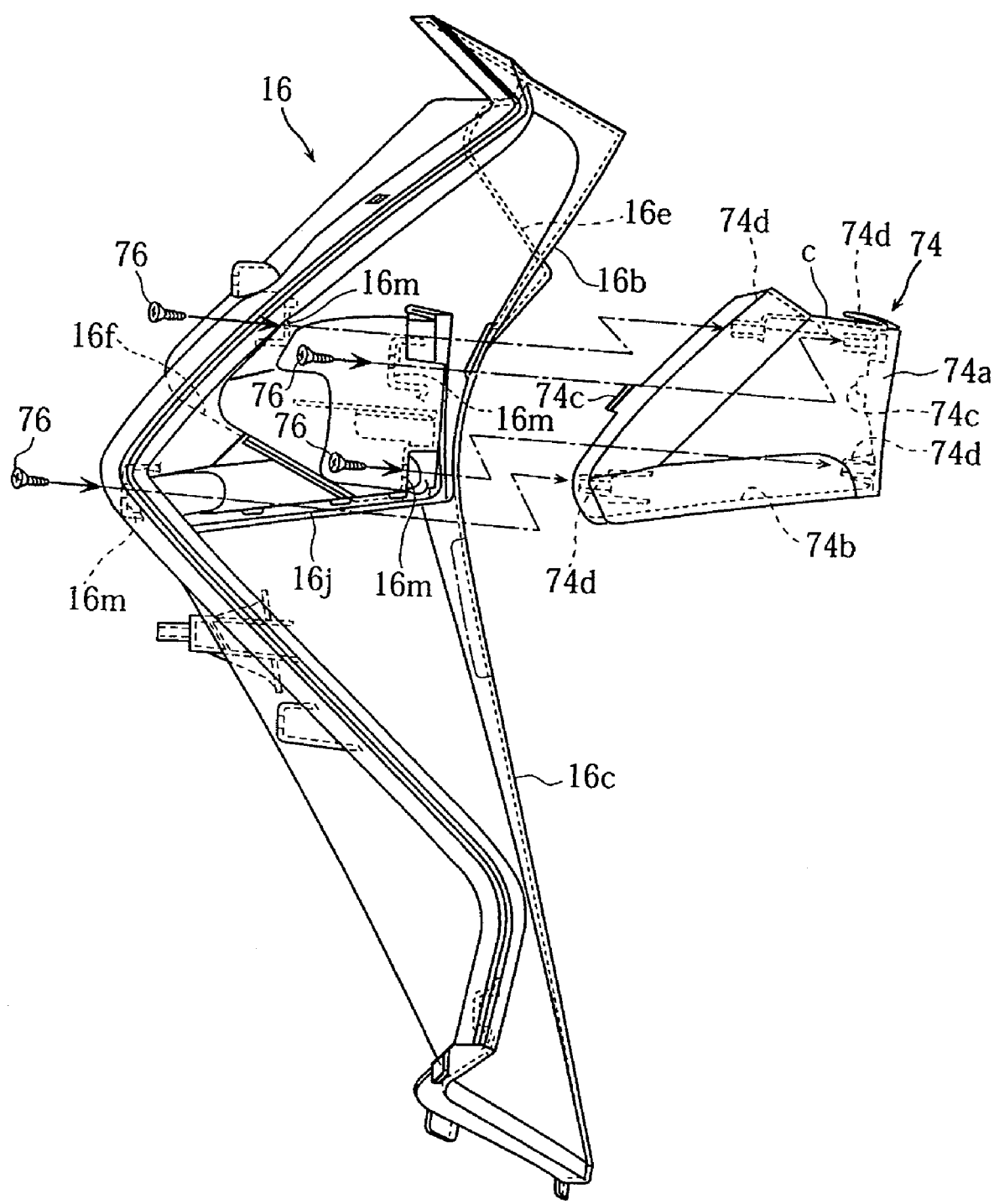
FIG. 4 is a side view of a rear cover of the leg shield of FIG. 2, showing the plate separated from the rear cover.

As shown in FIGS. 2 and 3, the front cover 15 comprises an upper cover portion 15a, which defines an opening edge of the headlight device 26, and left and right, lower cover portions 15b, 15b which extend downward while projecting outward in a lateral, or vehicle width direction relative to the upper cover portion 15a. Upper and lower edges of the lower cover portions 15b make body highlight lines a, b to accent an outward appearance of the motorcycle 1, especially when viewed from the side (see FIG. 3).

The rear cover 16 comprises a convex, upper tunnel portion 16b, which bulges rearward to surround a rear side of the head pipe 3, and a convex, lower tunnel portion 16c, which is contiguous to a lower end of the upper tunnel portion 16b and bulges rearward to surround a rear side of the main pipe 11. As viewed from the side of the motorcycle 1, the upper tunnel portion 16b is inclined forward as it extends downward, and the lower tunnel portion 16c is inclined rearward as it extends downward. A line of the rear edge of the rear cover 16 is substantially dog-legged in shape.

Figure 5:
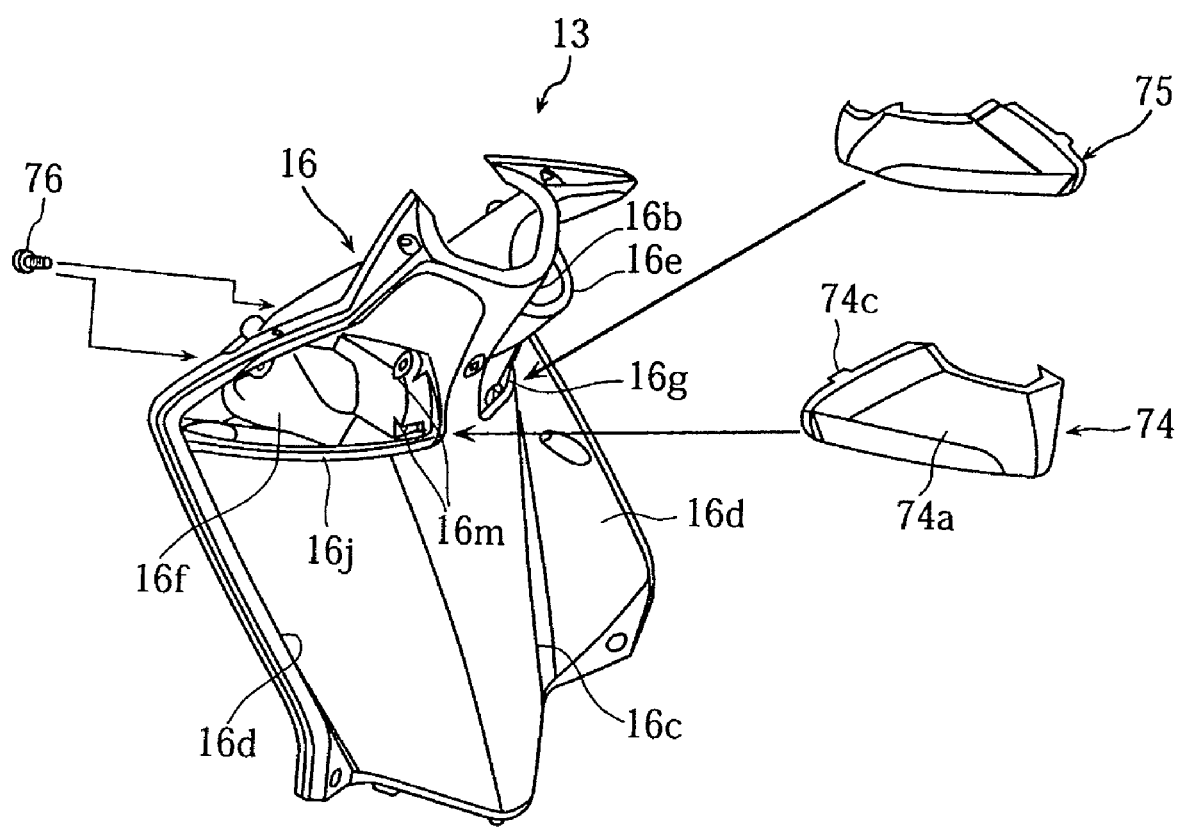
FIG. 5 is a perspective view showing a rear side of the rear cover. The plates are shown separated from the rear cover.
Figure 6:
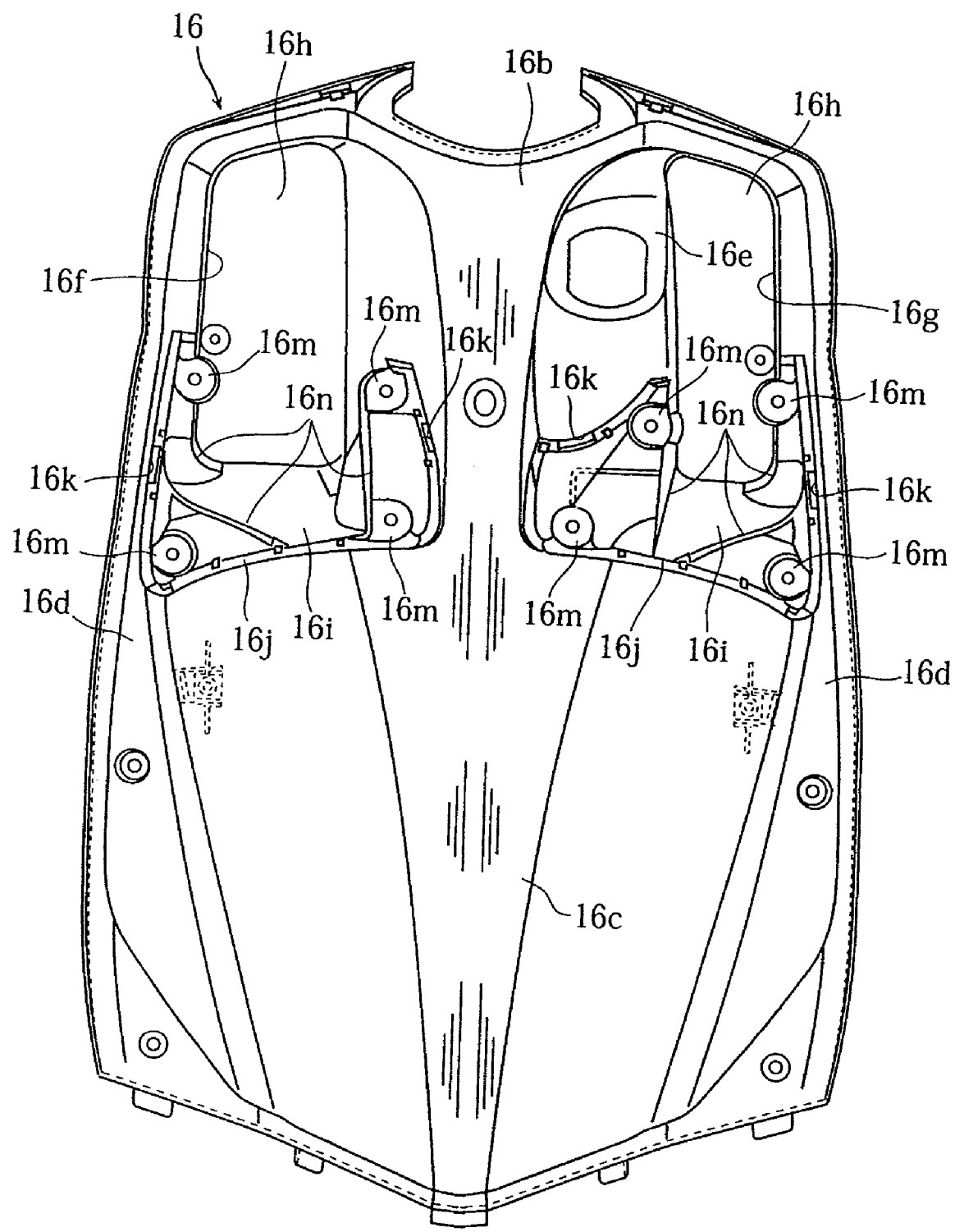
FIG. 6 is a rear view of the rear cover, without the plates being coupled to the cover.
Figure 7:
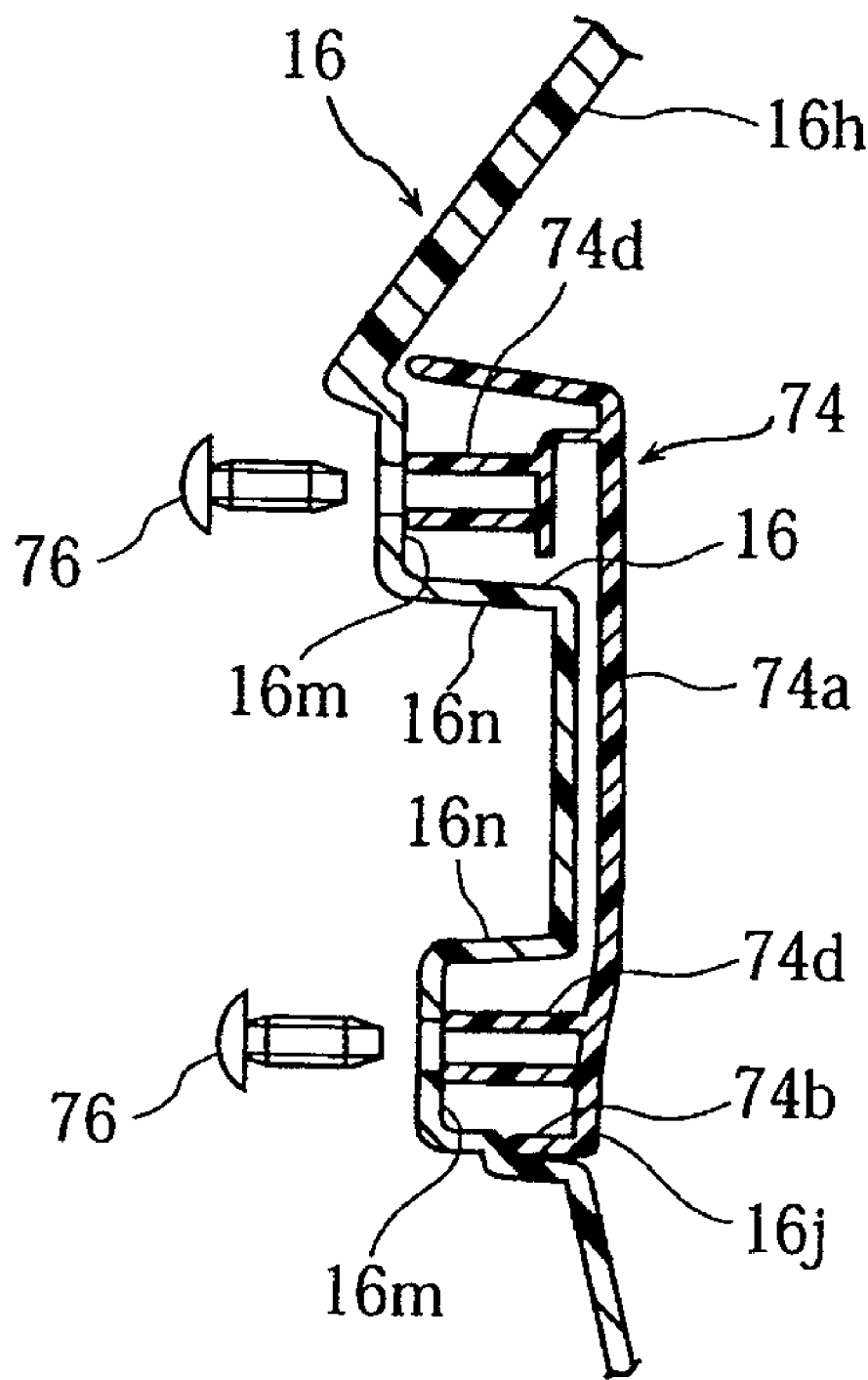
FIG. 7 is a cross sectional view, taken along the line VII-VII in FIG. 2, of the storage compartment.
Figure 8:
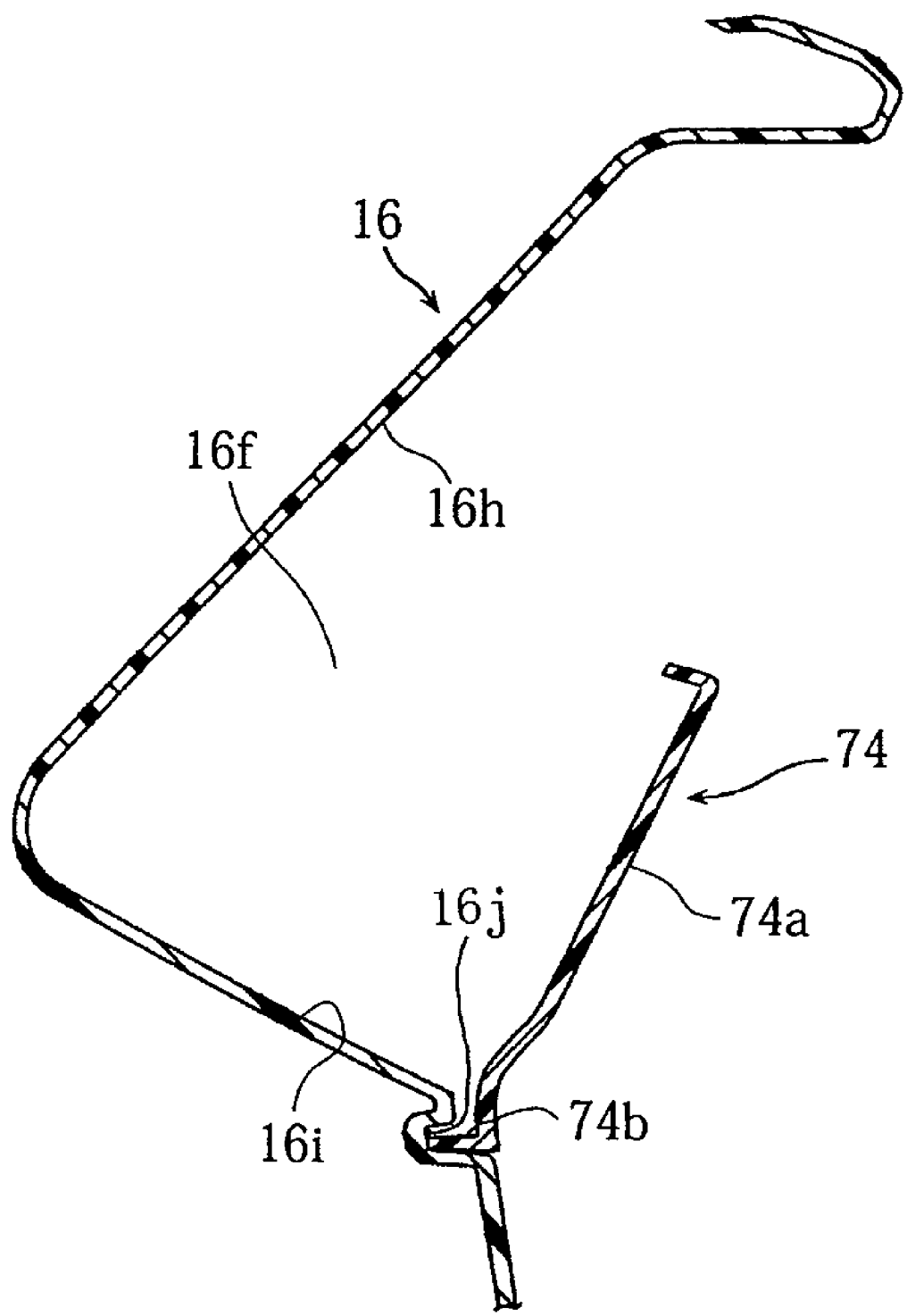
FIG. 8 is a cross sectional view, taken along the line VIII-VIII in FIG. 2, of the storage compartment.
Figure 9:
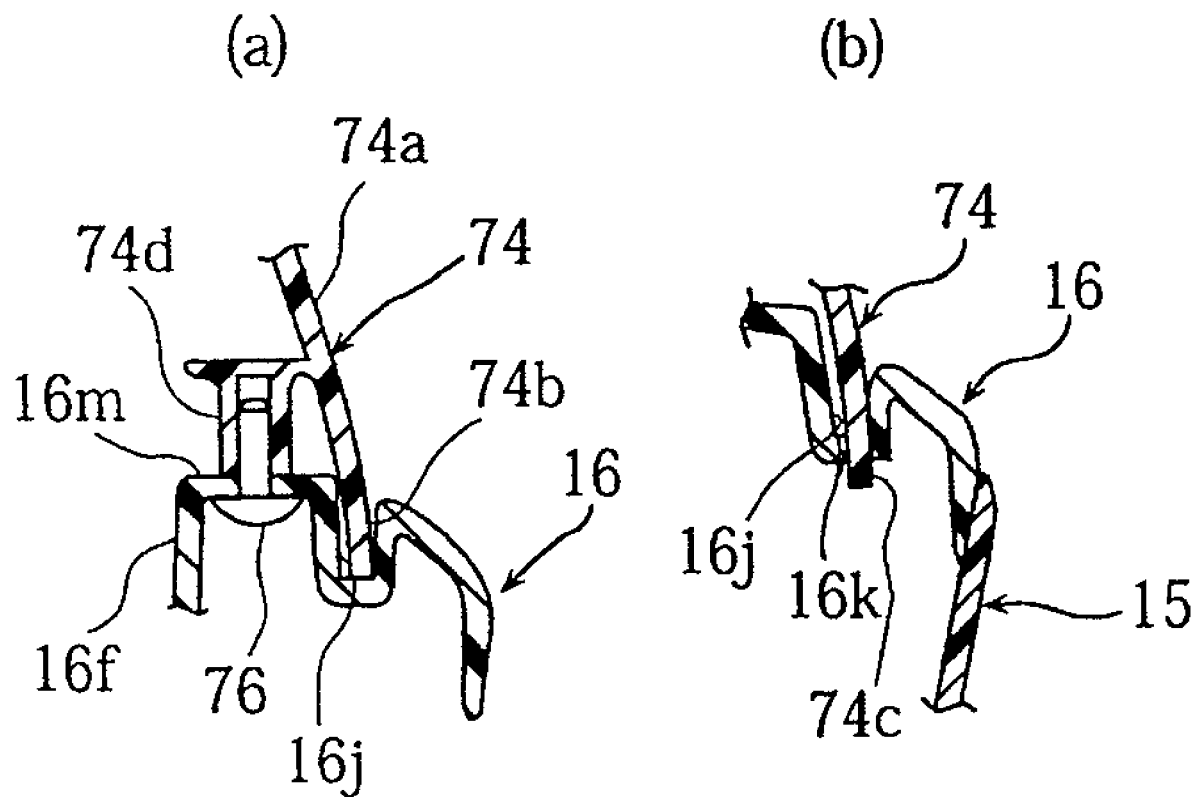
FIGS. 9a and 9b are cross sectional views, taken along the lines IXa-IXa and IXb-IXb in FIG. 2, respectively, of the storage compartment.
Figure 10:
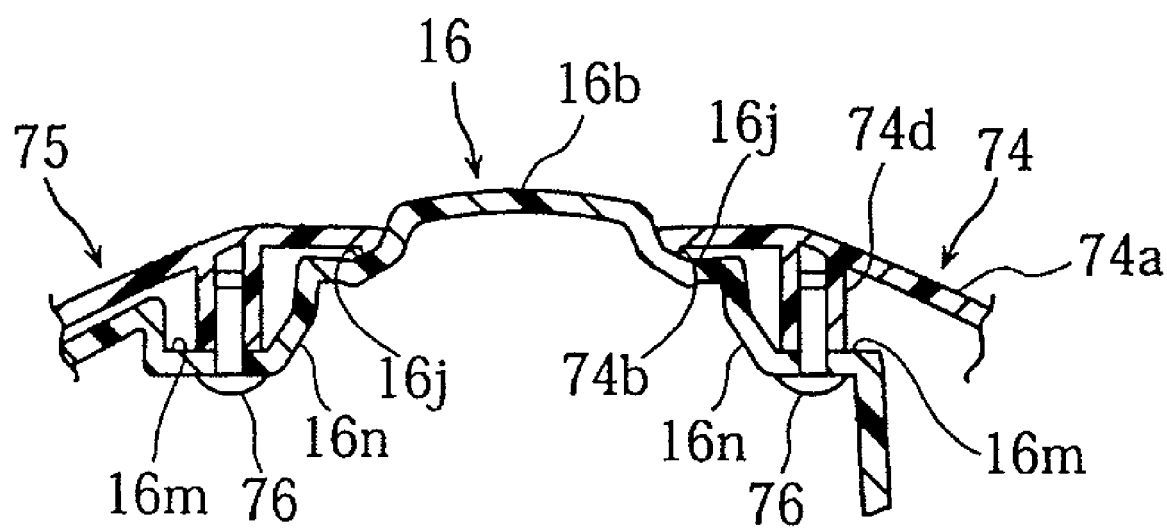
FIG. 10 is a cross sectional view, taken along the line X-X in FIG. 2, of the storage compartment.
Figure 11:
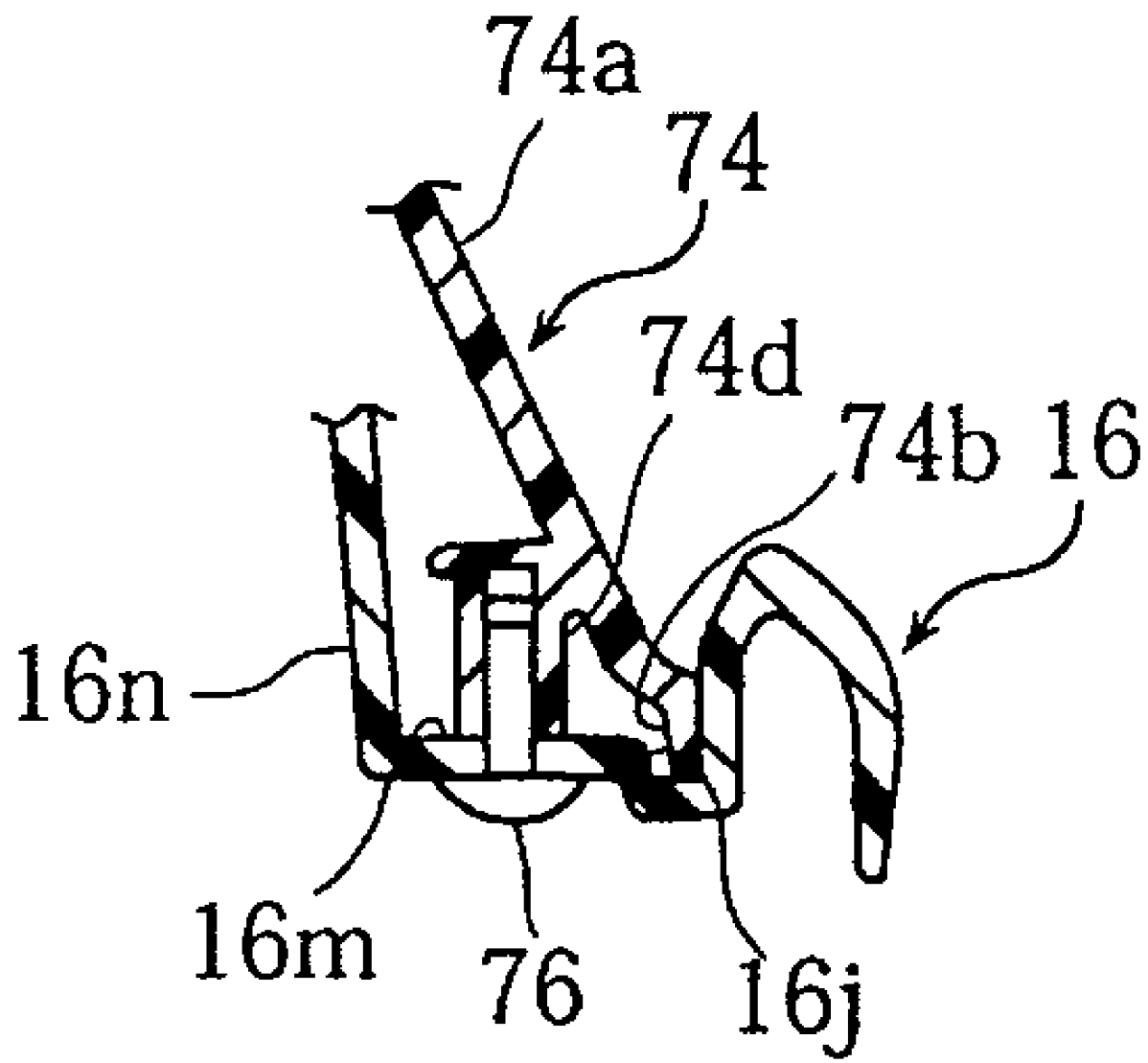
FIG. 11 is a cross sectional view, taken along the line XI-XI in FIG. 2, of the storage compartment.

The rear cover 16 comprises left and right shielding portions 16d, 16d, which spread laterally outward from left and right front edges of the upper and lower tunnel portions 16b, 16c (FIGS. 5 and 6). A front end of the foot board 19 is connected to lower ends of the left and right shielding portions 16d (FIG. 3).

A substantially cylindrical-shaped main-switch mount 16e is formed on a right side of the upper tunnel portion 16b of the rear cover 16 to project toward a driver and a main switch (not shown) is arranged in the main-switch mount 16e.

In the illustrated arrangement, the leg shield 13 is provided with independent, left and right storage compartments. The left and right storage compartments are formed by the rear cover 16 and left and right storage-compartment housings 74, 75. In the illustrated arrangement, the housings are in the form of plates 74, 75, which are separate components from the rear cover 16. The plates 74, 75 are generally plate-like in shape. That is, the plates 74, 75 are generally shallow structures with a generally flat wall and relatively short side wall portions extending from the flat wall. However, it is contemplated that the plates may take on a variety of shapes, from relatively shallow to relatively deep. Thus, the term plate is not intended to imply or require that such a component have any particular shape and, accordingly, the term is not limited to the generally shallow structures shown and described herein.

The left and right plates 74, 75 are arranged on a side of the leg shield 13 toward the driver and mounted detachably to the rear cover 16 by at least one and, optionally, by a plurality of fasteners. The fastener or fasteners may include any suitable mechanism for joining two or more component, such as, by way of example, screws and, preferably, self-tapping screws 76. In the illustrated arrangement, the screws 76 are inserted into the rear cover 16 generally in a direction from the front of the motorcycle toward the rear of the motorcycle, which is described in detail below.

Vertically long, left and right storage recesses 16f, 16g are formed between the upper tunnel portion 16b on a rear, upper region of the rear cover 16 and the left and right shielding portions 16d, 16d to bulge forward and to also extend vertically. Front walls 16h of the left and right storage recesses 16f, 16g are inclined forwardly in a downward direction and bottom walls 16i are inclined upwardly in a forward direction and define relatively large openings toward the driver. In addition, the front walls 16h and the bottom walls 16i on the storage recesses 16*f*, 16*g* are formed integral with the rear cover 16 by deforming the material constituting the rear cover 16 in a forward direction.

Also, a vertical dimension of the left and right storage recesses 16*f*, 16*g* are substantially equal to a vertical dimension of the upper tunnel portion 16*b*. A lateral dimension of the left storage recess 16*f* is defined from the upper tunnel portion 16*b* to an outer edge of the left shielding portion 16*d*, and a lateral dimension of the right storage recess 16*g* is defined from the main-switch mount 16*e* to an outer edge of the right shielding portion 16*d*. The right storage recess 16*g* is decreased in storage volume by approximately a volume of the main-switch mount 16*e*, as compared with the left storage recess 16*f*. As a result, the right storage recess 16*g* is about ½ the volume of the left storage recess 16*f* in the illustrated arrangement.

Positioning grooves 16*j*, 16*j* are formed on lower portions, or halves, of openings of the left and right storage recesses 16*f*, 16*g* to extend along peripheral edges of the lower halves. Also, left and right positioning holes 16*k*, 16*k* are formed on left and right, vertical sides of the left and right positioning grooves 16*j*, 16*j*.

Four mount seats (or bosses) 16*m* are formed on the lower halves of the openings of the left and right storage recesses 16*f*, 16*g* to be positioned proximate inner edges of the positioning grooves 16*j*. The respective mount seats 16*m* are arranged at left and right, upper ends of and on left and right lower corners of the lower halves of the openings.

Covering wall portions, or separating wall portions 16*n* are formed on the lower halves of the openings of the left and right storage recesses 16*f*, 16*g* to surround insides of the respective mount seats 16*m*. The respective covering wall portions 16*n* project rearward of the mount seats 16*m* to be close to inner surfaces of the storage-compartment plates 74, 75. The covering wall portions 16*n* form outer peripheral walls of volume defining spaces of the storage compartments. In other words, the respective mount seats 16*m* are arranged outside the respective covering wall portions 16*n*, that is, outside the volume defining spaces. Thus, the covering wall portions 16*n* are positioned between and separate the mount seats 16*m* from the volume defining spaces and, accordingly, may be referred to herein as "separating walls."

The left and right storage-compartment plates 74, 75 are arranged to cover the lower portions, or halves, of the openings of the storage recesses 16*f*, 16*g*. However, the plates 74, 75 may be configured to cover any desirable portion of the openings of the storage recesses 16*f*, 16*g*, preferably while still permitting access to the storage recesses 16*f*, 16*g* when the plates 74, 75 are attached. Since the left and right storage-compartment plates 74, 75 are substantially the same in structure as one another, only the left storage-compartment plate 74 is described in detail.

The left storage-compartment plate 74 comprises a lid-shaped plate body 74*a* to cover the lower half of the opening of the left storage recess 16*f*. An engaging portion 74*b* for engagement with the positioning groove 16*j* of the storage recess 16*f* is formed on an outer peripheral edge of the plate body 74*a* and engaging pieces 74*c*, 74*c* adapted to be inserted into the positioning holes 16*k* are formed on the engaging portion 74*b* to project forward. Also, four thread insertion portions 74*d* are formed on the plate body 74*a* to project forward so as to abut against the respective mount seats 16*m*.

The respective thread insertion portions 74*d* optionally comprise cylindrical-shaped projections and are arranged to be opposed to the respective mount seats 16*m*. That is, the projections are positioned outside the volume defining spaces of the storage recesses 16*f*.

The storage-compartment plates 74 abut against the rear cover 16 from a driver's side. The engaging pieces 74*c* are inserted into the positioning holes 16*k* and the engaging portions 74*b* are caused to engage with the positioning grooves 16*j*. The respective thread insertion portions 74*d* abut against the respective mount seats 16*m*. In this state, the screws 76 are directed generally in parallel to a central, vertical plane L (FIG. 2) to be screwed into the thread insertion portions 74*d* through the respective mount seats 16*m* from the front side of the rear cover 16. Thereby, the storage-compartment plates 74 are secured to the rear cover 16. At this time, the respective thread insertion portions 74*d* are covered from the side by the respective covering wall portions 16*n* of the storage recesses 16*f*. Thus spaces surrounded by wall surfaces, which include the covering wall portions 16*n* of the storage recesses 16*f*, and the storage-compartment plates 74 form the volume defining spaces of the storage compartments.

After the storage-compartment plates 74 are mounted, the front cover 15 is mounted and fixed to the rear cover 16. Thereby, the respective screws 76 are covered by the front cover 15 and the rear cover 16 to be unseen from the outside.

As shown in FIG. 3, upper edges c of the storage-compartment plates 74 are positioned to be contiguous to the highlight lines a on the upper edges of the lower cover portions 15*b* of the front cover 15. Lower edges d of the storage-compartment plates 74 extend downwardly in a forward direction to be substantially in parallel to the highlight lines b on the lower edges of the lower cover portions 15*b*. Furthermore, highlight lines e are formed on the storage-compartment plates 74 to be contiguous to the highlight lines b. Thereby, as viewed from the side, the motorcycle 1 has an outward appearance as if the storage-compartment plates 74, and hence the storage compartments, define surfaces contiguous to the lower cover portions 15*b* and the storage compartments extend to a front edge of the front cover 15.

According to the illustrated embodiment, since the rear cover 16 of the leg shield 13 and the left and right storage-compartment plates 74, 75, which are separate from the rear cover 16, form the independent, left and right storage compartments and the left and right storage-compartment plates 74, 75 are fixed to the rear cover 16 by screws 76, which are inserted from the front of a vehicle, the screws 76 are unseen from a rearward, or driver's side in spite of an arrangement of the storage-compartment plates 74, 75 on the driver's side. As a result, deterioration in the outward appearance caused by exposure of the screws 76 to the driver's side is avoided and undesired removal of the storage-compartment plates 74, 75, by mischief or the like, is reduced or eliminated.

According to the illustrated embodiment, since the leg shield 13 comprises the rear cover 16 positioned on the driver's side and the front cover 15 positioned forwardly of the rear cover 16 and at least a portion of the screws 76 are arranged between the front cover 15 and the rear cover 16, the respective screws 76 are surrounded by the front and rear covers 15, 16 to thereby be unseen from the driver's side and the front of a vehicle.

Since the thread insertion portions 74*d* are formed on the left and right storage-compartment plates 74, 75 and abut against the respective mount seats 16*m* of the rear cover 16, the storage-compartment plates 74, 75 can be readily mounted by screwing the screws 76 into the thread insertion portions 74*d*.

According to the illustrated embodiment, since the respective thread insertion portions 74*d* comprise the cylindrical-shaped projections and sides of the respective thread insertion portions 74*d* are covered by the respective covering wall portions 16*n* of the rear cover 16, the thread insertion portions 74d comprising the projections can be prevented from being exposed into the storage spaces.

Also, since the respective thread insertion portions 74d are covered by the covering wall portions 16n, it is possible to prevent the thread insertion portions 74d from projecting into the storage spaces, and it is possible to prevent a stored body from being caught by the thread insertion portions 74d and from entering into a gap upon taking items in or out of the storage spaces, thus enabling convenience use of the storage spaces.

According to the illustrated embodiment, since the respective thread insertion portions 74d are arranged outside the volume defining spaces of the storage compartments, the storage compartments are not decreased in volume by the thread insertion portions 74d, so that it is possible to provide an advantageously sized storage volume.

Also, owing to such a construction, in which only the lower portions or halves of the openings of the left and right storage recesses 16f, 16g are covered by the storage-compartment plates 74, 75, it is possible to readily take out and receive even a lengthy item, which is longer than the vertical dimension of the storage recesses 16f, 16g, thus improving the convenience of using the storage recesses 16f, 16g.

Figure 12:
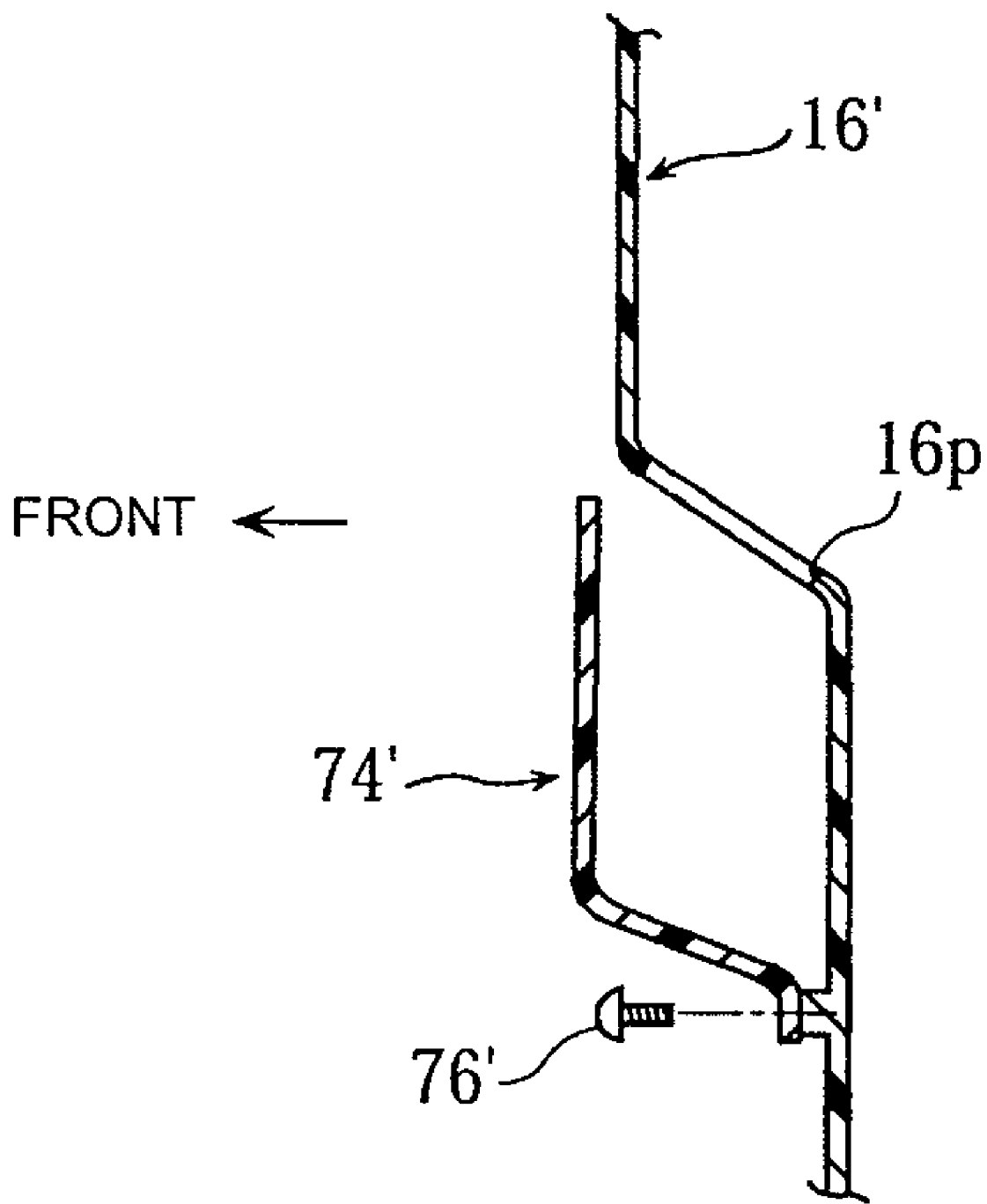
FIG. 12 is a cross sectional view of a modification of the storage compartment shown in FIGS. 1-11.

In addition, while the embodiment described above has been described with respect to the case where the storage-compartment plates 74, 75 are arranged on a side of the rear cover 16 toward a driver to define the storage compartments, storage compartments may be defined according to the an embodiment of the invention by, for example, arranging storage-compartment plates 74' on an opposite side of a rear cover 16' to a driver, that is, on a front side as shown in FIG. 12. In this case, the storage-compartment plates 74' will also be fixed to the rear cover 16' by clamping members 76', which are inserted from the front of a vehicle. Also, in this case, it suffices to form access ports 16p on the rear cover 16'. Owing to such structure, both the clamping members 76' and the storage-compartment plates 74' can be unseen from a driver's side.

Also, while the embodiment described above has showed the case where the screws (fasteners or clamping members) 76 are directed generally in parallel to the central, vertical plane L, the screws 76 are not necessarily required to be directed in parallel to the vertical plane L but may be directed in a direction, which is inclined relative to the vertical plane L within the range of about 45 degrees in a left and right direction. Depending upon the specific shape of the leg shield 13, larger angles of insertion may be possible. However, preferably, the insertion direction includes a component within the plane L, or along the length of the motorcycle 1.

Furthermore, while the embodiment described above has showed the case where the "fasteners" or "clamping members" comprise tapping screws, other members than tapping screws such as, for example but without limitation, bolts may be used.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present motorcycle with a storage compartment has been described in the context of particularly preferred embodiments, the skilled artisan will appreciate, in view of the present disclosure, that certain advantages, features and aspects of the described motorcycle may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A motorcycle, comprising:
   a leg shield located forward of the legs of a driver of the motorcycle, wherein the leg shield comprises a front cover and a rear cover secured to one another and defining an interior space therebetween;
   a plate that is a separate member from the leg shield, wherein the plate is secured to the leg shield by at least one fastener, a portion of which is located within the interior space.

2. The motorcycle of claim 1, wherein the plate is secured by the fastener to the rear cover.

3. The motorcycle of claim 2, wherein the plate is secured to the rear cover by the fastener before the front cover is secured to the rear cover.

4. The motorcycle of claim 1, wherein the fastener is a screw and a head of the screw is located within the interior space defined by the leg shield.

5. The motorcycle of claim 1, wherein a portion of the frame of the motorcycle is located within the interior space.

* * * * *